June 22, 1971 L. WESCH 3,586,561
PROCESS AND APPARATUS FOR THE MANUFACTURE OF FIBER GLASS
REINFORCED PLASTIC TUBES AND SIMILAR BODIES
Filed March 17, 1967 5 Sheets-Sheet 1

Inventor:
Ludwig WESCH
by: Arthur O. Klein
his Attorney

Inventor:
Ludwig WESCH
by: Arthur O. Klein
his Attorney

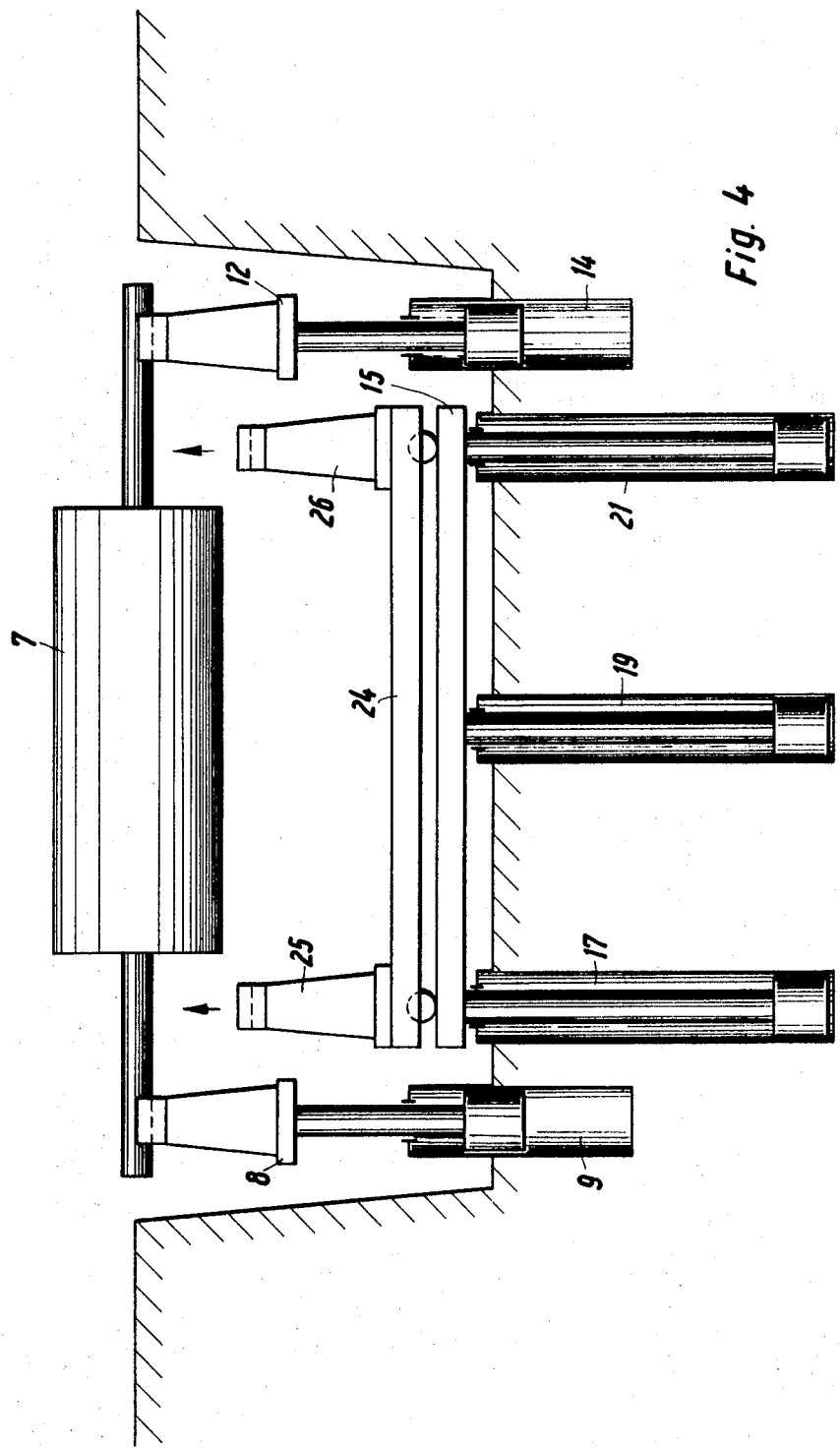

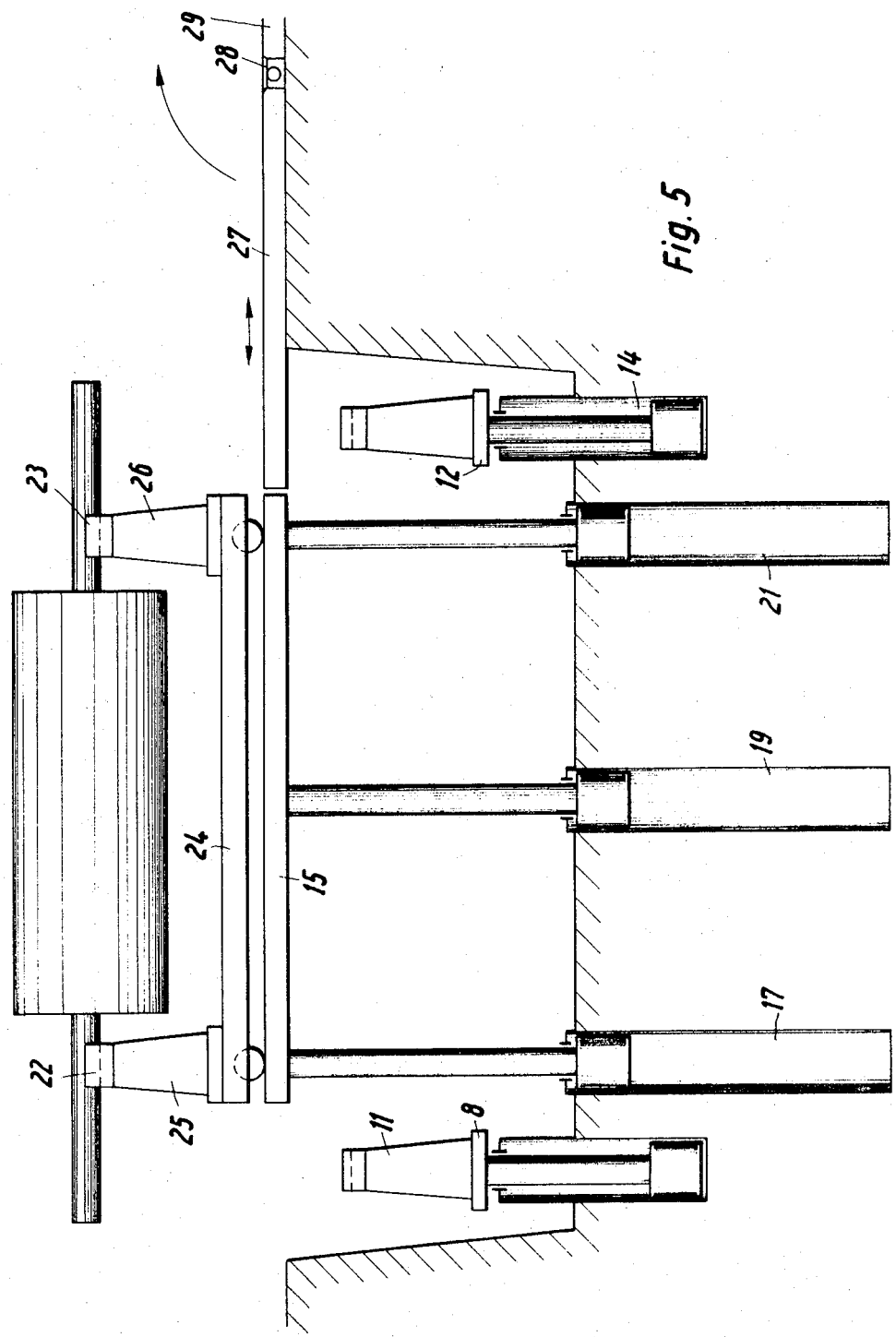

United States Patent Office 3,586,561
Patented June 22, 1971

3,586,561
PROCESS AND APPARATUS FOR THE MANUFACTURE OF FIBER GLASS REINFORCED PLASTIC TUBES AND SIMILAR BODIES
Ludwig Wesch, Heidelberg, Germany, assignor to Mancar-Trust, Vaduz, Liechtenstein
Filed Mar. 17, 1967, Ser. No. 624,065
Claims priority, application Switzerland, Mar. 24, 1966, 4,262/66
Int. Cl. B65h 81/02
U.S. Cl. 156—172  8 Claims

ABSTRACT OF THE DISCLOSURE

A process and apparatus for manufacturing reinforced fiber glass tubes including the step of spooling a plurality of roving strands impregnated with liquid synthetic resin onto a rotatably mounted and vertically adjustable winding cylinder drum. The roving strands are either first passed through at least one impregnating bath prior to being spooled onto said drum, or they are passed through at least one heating installation where the synthetic resin of the already impregnated roving strands is softened prior to the spooling of the impregnated roving strands onto said drum, onto which said roving strands are directly guided from said impregnating bath, respectively heating installation; thereafter the roving strands pass through other means forming part of the overall apparatus.

---

The mass production of reinforced fiber glass tubes by means of the "filament winding" process requires the use of a large number of roving strands and a high rotational spooling speed. Furthermore, the installation must be adjustable over a wide range of spooling angles and be adapted to spool roving strands over spooling drums ranging from as little as 5 cm. in diameter up to cylinders or tubes having a diameter of 10 meters.

A number of "filament winding" process installations are already known in the art. Some of these known installations include a fixed impregnating bath through which the roving strands are passed. The roving strands are thereafter deflected and passed through a combing installation, whereby reinforced fiber glass tubes can be produced with a limited adjustment of the spooling angle. These known installations have an important drawback in that large frictional forces occur which cause individual roving strands, due to being subjected to tensional forces as well as fritcional and deflectional forces, to frequently split and rupture which makes for inordinately high "down-times" in the known installations.

In other known "filament winding" process installations the spools of strands are either mounted on a stationary support or they are mounted on a movable support so that they can move in an axial direction along the winding drum jointly with the impregnating bath. These types of known installations are cumbersome because only a limited number of spools may be simultaneously used with only a limited spooling speed.

It is, therefore, a general object of this invention to provide a process and apparatus for manufacturing fiber glass reinforced plastic tubes in which the aforedescribed drawbacks have been eliminated.

The above described object is obtained by providing the process and installation of the invention with at least one last impregnating bath, respectively heating arrangement, from which the roving strands pass directly to the spooling drum without undergoing any further significant deflections.

The process and apparatus of this invention further comprises a movable support carriage, on which there are mounted the spools of roving strands, which is adapted to move to and fro parallel along the axis of the winding cylinder drum onto which the roving strands are finally spooled. The installation further comprises at least one impregnating bath or at least one heating arrangement; furthermore, the spooling drum is vertically adjustable with respect to the exit level of the roving strands from the impregnating bath or heating arrangement.

The process and apparatus of this invention advantageously permits the simultaneous unspooling of a large number of spools of roving strands (up to two hundred in number) which, due to the simplified guiding thereof, avoids the usual frictional forces that occur due to deflection and passages through combing installations, so that the roving strands can be spooled onto the cylinder drum with significantly reduced malfunctioning due to splitting and/or rupture. Furthermore, since a plurality of impregnating baths, mounted one behind the other, may be used, the operating speed of the entire installation may be significantly increased because the optimum required impregnating period can be thus obtained. The supporting structure for the winding drum is preferably provided with its own driving mechanism and is adjustable in the vertical direction so that the winding drum may be adjusted to an optimum height with respect to the roving strands exiting from the last impregnating bath or heating arrangement. Due to the adjustability in the vertical direction of the winding drum support structure, fiber glass tubes having a wide range of diameters may be produced with the same installation.

The winding drum support structure may be at ground level with the vertical adjustment mechanism being installed below ground level. Alternatively, the entire drum support structure may be mounted in a shaft, which has a width approximately twice as long as the maximum diameter of the winding drum and a corresponding depth. The roving strands may preferably be spooled onto the winding drum cylinder in three different ways: (a) the axis of the winding drum cylinder is positioned at the level of the exiting roving strands; (b) the upper peripheral surface of the winding drum cylinder is positioned at the level of the exiting roving strands; (c) the lower peripheral surface of the winding drum cylinder is positioned at the level of the exiting roving strands so that the latter are spooled onto the drum from below.

The winding cylinder support structure, in accordance with this invention, also may be adjusted vertically during the manufacturing process proper, which is particularly advantageous when the spooling angle is changed during the winding process. By making such an adjustment it is possible to close the open rhombic spaces of a spooling position by means of cross-over spooling. Furthermore, by making the spooling particularly steep, the tube is further strengthened against radial pressure. On the other hand, a flat spooling angle makes it possible to considerably reduce the longitudinal deformations which occur when the tube is placed under tension. Thus, it is possible to make all kinds of adavntageous adjustments with the apparatus of this invention in order to attain the optimum relationships which correspond to the eventual use of the end product.

The drawing mechanisms for moving the carriage which supports the spools of roving strands include fine adjustments means for adjusting the velocity thereof. The rotational velocity of the winding drum is also finely adjustable and the winding drum support structure is provided with an adjustable hydraulic mechanism for the vertical adjustment thereof. The control of the various driving mechanisms is advantageously effected by electrical control means so that predetermined spooling positions can be easily preselected.

The process of this invention is further improved by adjusting all spools of roving strands to a constant strand pull by fully automatic means such as mechanical, magnetic or electro-magnetic brake means, so that spools having a great strand length or rovings having a variety of numbers of single threads may be used in the installation of this invention.

These and other features and advantages of the present invention will become further apparent from the following detailed description thereof which is to be read with reference to the accompanying drawings, in which:

FIG. 4 illustrates schematically in elevation the entire winding drum support structure; and FIG. 5 illustrates schematically in elevation the entire winding drum support structure with the additional winding drum support structure lifting means in their upper limit position.

Figure 1:
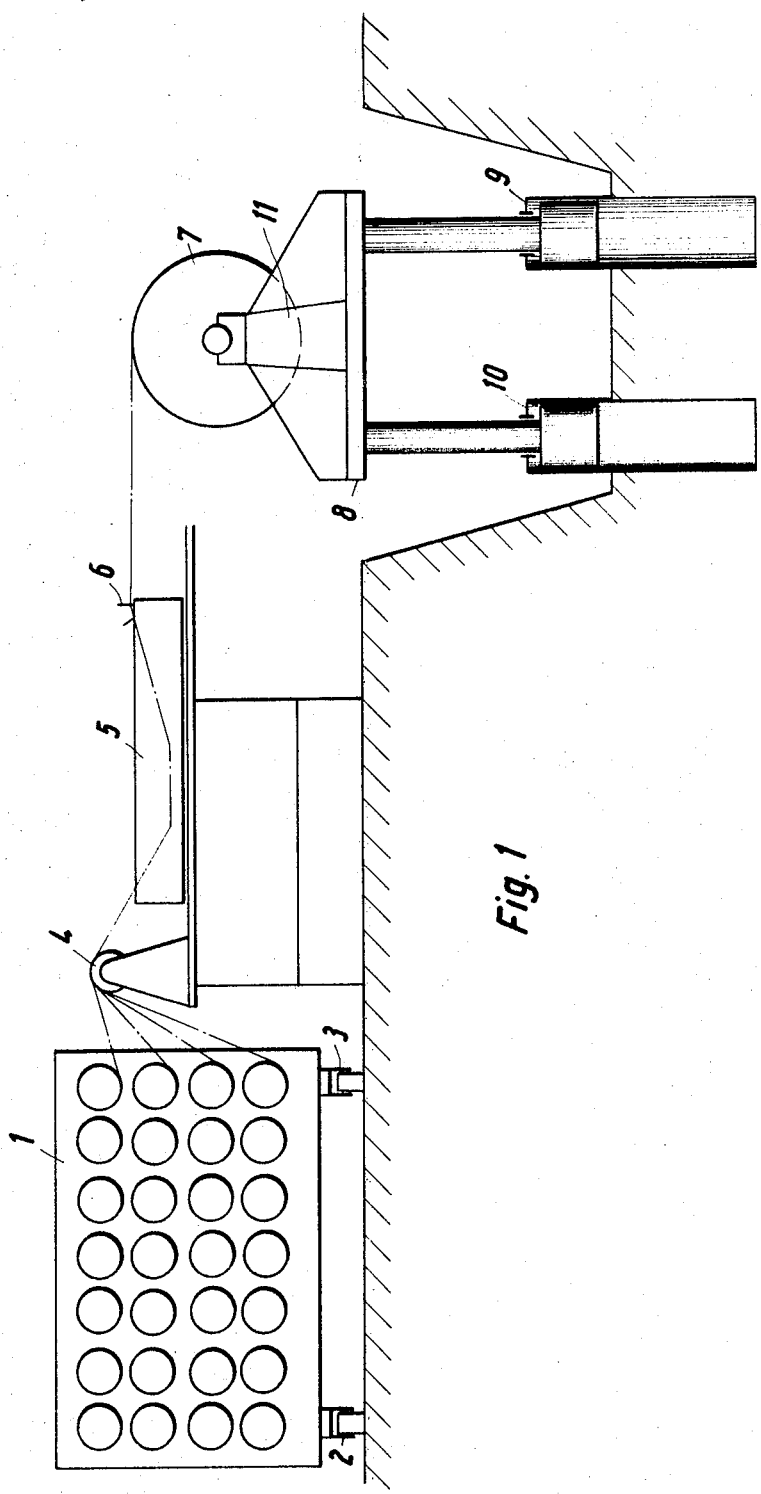
FIG. 1 is an elevational view which illustrates schematically one embodiment of the apparatus in accordance with this invention.

Referring now to the drawing there is illustrated in FIG. 1 a movable roving strand spools support carriage 1 which is mounted on rollers 2 and 3 made of rubber or other suitable elastomer material which are adapted to reciprocally move on a pair of rails. The support carriage 1 is secured to an impregnating bath 5 which is slidably supported on a stationary support and which moves jointly with the support carriage 1. The roving strands run from the plurality of spools supported on the support carriage 1, over one or more rollers 4, which are provided with suitable grooves, through the impregnating bath system 5 and thence through a comb arrangement 6, the teeth distances of which are adjusted so that they correspond to the desired spooling density, and finally are wound on the winding cylinder drum 7.

The entire support carriage 1 complex with the impregnating bath system 5 may be reciprocally moved by directly driving the rollers 2 and 3 or by means of a conventional chain-drive system. The winding cylinder support structure 15 (FIGS. 4 and 5) is either arranged at the same level as the support carriage 1 or is mounted in a subterranean shaft in which there are provided four hydraulic or other suitable lifting means 9, 10, 13 and 14. An electric motor drive (not illustrated) may be mounted on the winding drum cylinder support 11 for directly driving the cylinder 7.

Figure 2:
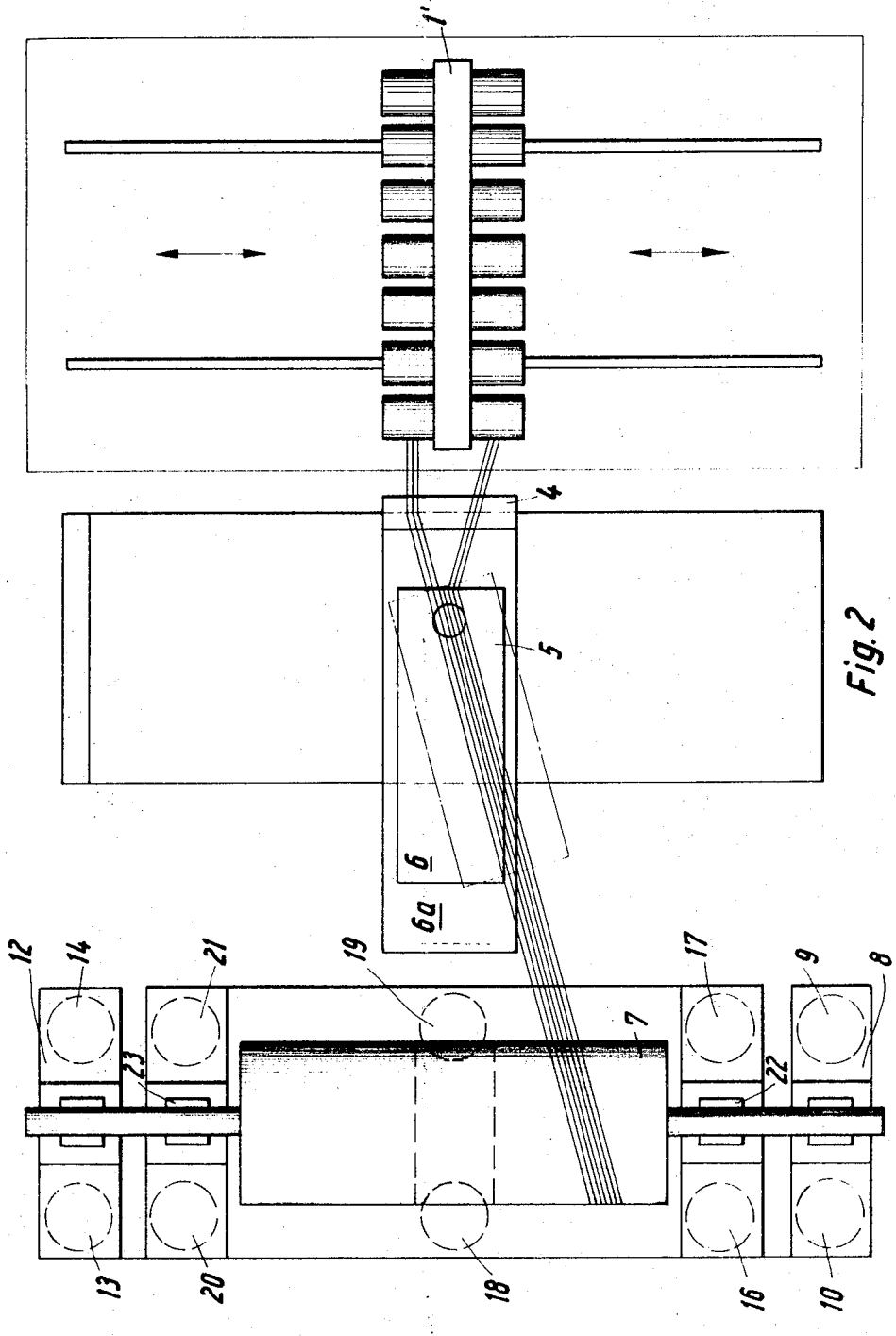
FIG. 2 is a schematic plan view of the apparatus illustrated in FIG. 1.

FIG. 2 illustrates in plan view the arrangement of FIG. 1 in which the movability of the impregnating bath system 5 is indicated in dot-dash lines. The axis of the impregnating bath system is either firmly mechanically secured to its support or automatically self adjusts itself due to the pull in the roving strands or is regulated by a separate drive in accordance with the progressive motion of the roving strand spools support carriage complex. If the arrangement is to operate without adjustability of the impregnating bath system 5 a second comb arrangement 6a may be mounted on the impregnating bath system 5.

Figure 3:
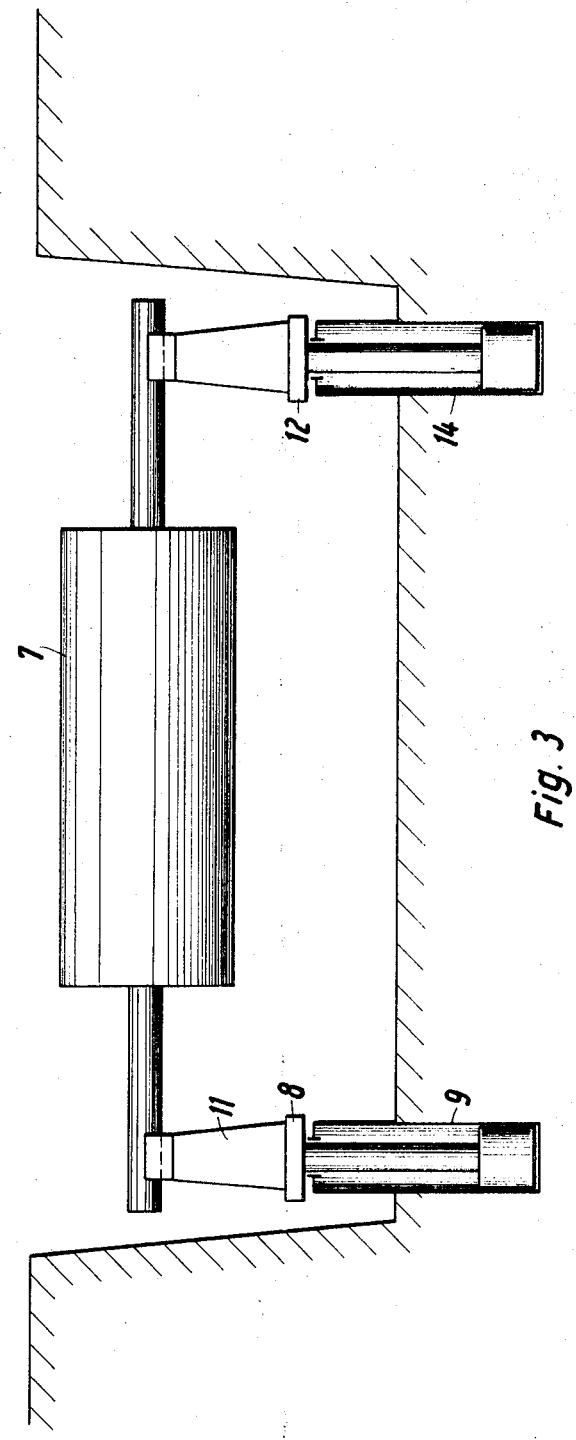
FIG. 3 illustrates schematically in elevation the winding drum support structure of the apparatus illustrated in FIGS. 1 and 2, but without the additional winding drum support structure lifting means.

As can be noted from FIG. 3 the winding cylinder drum 7 has a pair of shaft extensions which are rotatably supported on a pair of support members 11 which are respectively mounted on supporting plates 8 and 12. The supporting plates 8 and 12, in turn, are mounted on a hydraulic lifting mechanism 9, 10 and 13, 14. A driving mechanism (not illustrated) is mounted at one side of the winding cylinder drum 7 and drives the latter via one extension of the pair of shaft extensions.

As can be noted from FIG. 4 a lifting platform 15 may be mounted in the shaft between the hydraulic lifting mechanism 9, 10 and 13, 14 and directly underneath the winding cylinder drum 7. A hydraulic lifting mechanism 16, 17, 18, 19, 20, 21 is adapted to selectively lift the platform 15 and, by means of the support members 25 and 26, respectively the bearings 22, 23, which engage the pair of shaft extensions, lift the winding cylinder drum 7. The support member 25 and 26 are mounted on a carriage 24 which is movably supported on the platform 15 by means of a pair of wheels. Thus, there are illustrated in FIG. 4 all of the lifting mechanisms of the apparatus and method of this invention.

FIG. 5 illustrates the winding cylinder drum 7 being supported by the carriage 24. The latter may be moved onto a swivel platform 27, which is adapted to swing the winding cylinder drum 7 by means of the pivot member 28 onto a transport member 29 from whence the spooled roving strands are moved to other stations. The hydraulic lifting mechanism 16, 17, 18, 19, 20, 21 includes servo motors (not illustrated) for lifting the platform 15.

It is also possible to produce close-end containers by means of the polar winding method with the apparatus of this invention. This can be done by reducing the number of roving strands and by utilizing a specially shaped winding drum cylinder and adjusting the various driving mechanisms of the apparatus accordingly. Thus, the apparatus of this invention may be used in the manufacture of all kinds of sizes and types of containers by adjusting the various driving mechanisms and/or install appropriate parts in the apparatus.

A known installation for removing and collecting the excess resin may also be included in the apparatus of the invention. In addition thereto, a known vacuum pump installation may be included to remove any captive air bubbles that may be present in the resin. Furthermore, it should be noted that pre-impregnated roving strands may be used with the apparatus of this invention, in which case instead of impregnating bath system 5a a suitable heating system (not illustrated) forms part of the apparatus of this invention.

Due to the very simple guiding system and construction of the apparatus of this invention the roving strand spools may be mounted in an insulated closed housing where the roving strands are preheated by suitable means mounted between the spools or by forced air currents, so that the roving strands enter the impregnating bath system 5 without any residual water content. The heating of the roving strands during the process of this invention, can be continued during the run of the roving strands by heating the winding cylinder drum 7 or the winding cylinder drum system.

The process and apparatus of this invention which is adapted for mass production, can utilize winding cylinder drums having a length of up to 12 meters and can consume fiber glass resin of up to one ton per hour.

The process and apparatus of the invention may be used for the fabrication of all kinds of tubes of varying diameters; also in the fabrication of ring systems for antenna towers and also in the fabrication of silos, as well as cylinders used in the production of containers and tanks.

The products fabricated with the method and apparatus of this invention give the theoretical and practical highest yields in strength and quality per consumed material when compared with products fabricated with similar apparatus of the prior art.

It is also possible to utilize a liner made of suitable elastomer material, such as for example polyvinylchloride, polyethylene, asbestos, concrete cement, etc., which can be mounted over the cylinder drums 7. The roving strands are then wound over this liner as is described in the German patent application Ser. No. W 38,592 IVC/396 and W 37,521 IVC/396 of the inventor.

Without further analysis, it will be obvious to those skilled in the art, upon a study of this disclosure, that this invention permits various modifications and alterations without omitting features that, from the standpoint of prior art, fairly constitute essential characteristics of the generic or specific aspects of this invention, and, therefore, such modifications, and alterations are intended to be comprehended within the meaning, scope and range of equivalence of the following claims.

What I claim is:

1. In a process for the manufacture of fiber glass reinforced plastic tubular bodies with a plurality of roving strands impregnated with liquid resin, wherein said roving strands are passed from a source of strands through a strand treating system comprising at last one impregnating bath system or at least one heating system, the improvement comprising, the step of directly extending said plurality of roving strands from said strand treating system substantially without any deflections thereof to the surface of an axially extended winding cylinder drum, and axially reciprocating the winding drum relative to the strand source and the strand treating system so as to wind the strands in successive layers on the winding drum at opposite angles with respect to the axis of the drum, and vertically adjusting said cylinder drum relative to the source of strands and the strand treating system whereby to maintain the strands being wound against any deflections thereof throughout the winding operation.

2. In a process as set forth in claim 1, the improvement wherein the source of strands comprises a plurality of spools of roving strands rotatably mounted on a carriage, said plurality of roving strands being guided onto said winding cylinder drum via said impregnating bath system or said heating system, and comprising the step of braking the rotational movement of each of said plurality of spools of roving strands thereby regulating the pull on the individual roving strands.

3. In a process as set forth in claim 1, the improvement including pre-impregnating said plurality of roving strands and directly winding said pre-impregnated roving strands onto said winding cylinder after having passed through said heating system.

4. In a process as set forth in claim 1, the improvement including the step of first placing a liner made of suitable elastomer material onto said winding cylinder drum, and thereafter winding said plurality of roving strands, which have first been guided through said strand treating system, onto said liner.

5. In a process as set forth in claim 4, wherein said liner is made of polyvinylchloride.

6. In a process as set forth in claim 4, wherein said liner is made of polyethylene.

7. In a process as set forth in claim 4, wherein said liner is made of asbestos.

8. In a process as set forth in claim 4, wherein said liner is made of concrete cement.

References Cited

UNITED STATES PATENTS

| | | | |
|---|---|---|---|
| 2,010,475 | 8/1935 | Bowen | 156—173X |
| 3,216,876 | 11/1965 | Tyhurst | 156—173 |
| 3,379,591 | 4/1968 | Bradley | 156—173 |
| 3,470,917 | 10/1969 | Grosh | 156——173 |

BENJAMIN R. PADGETT, Primary Examiner

U.S. Cl. X.R.

156—169, 173